Sept. 11, 1923.  1,467,710
G. B. CULPEPPER
COOKING VESSEL
Filed March 19, 1923   2 Sheets-Sheet 1
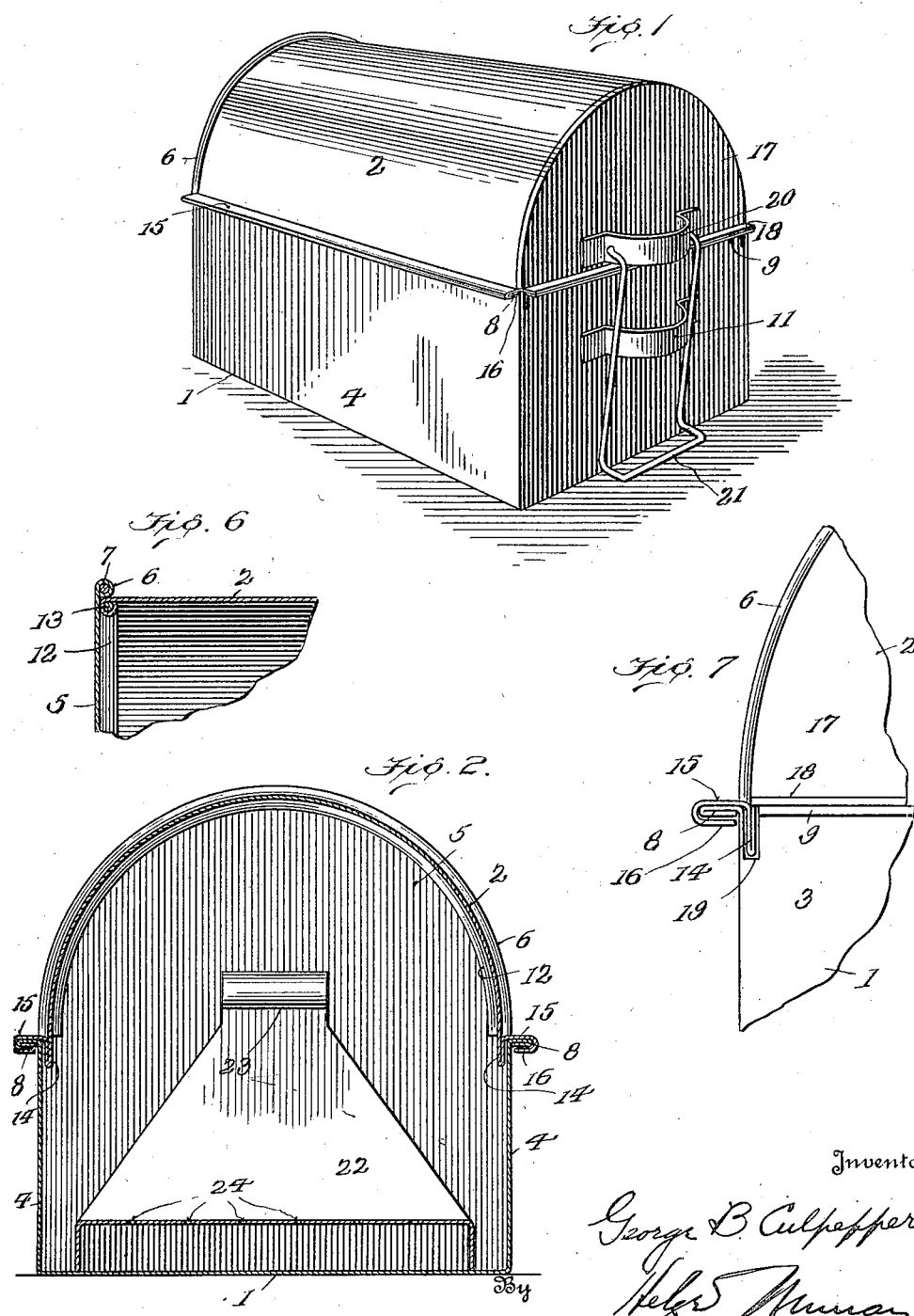
Inventor
George B. Culpepper

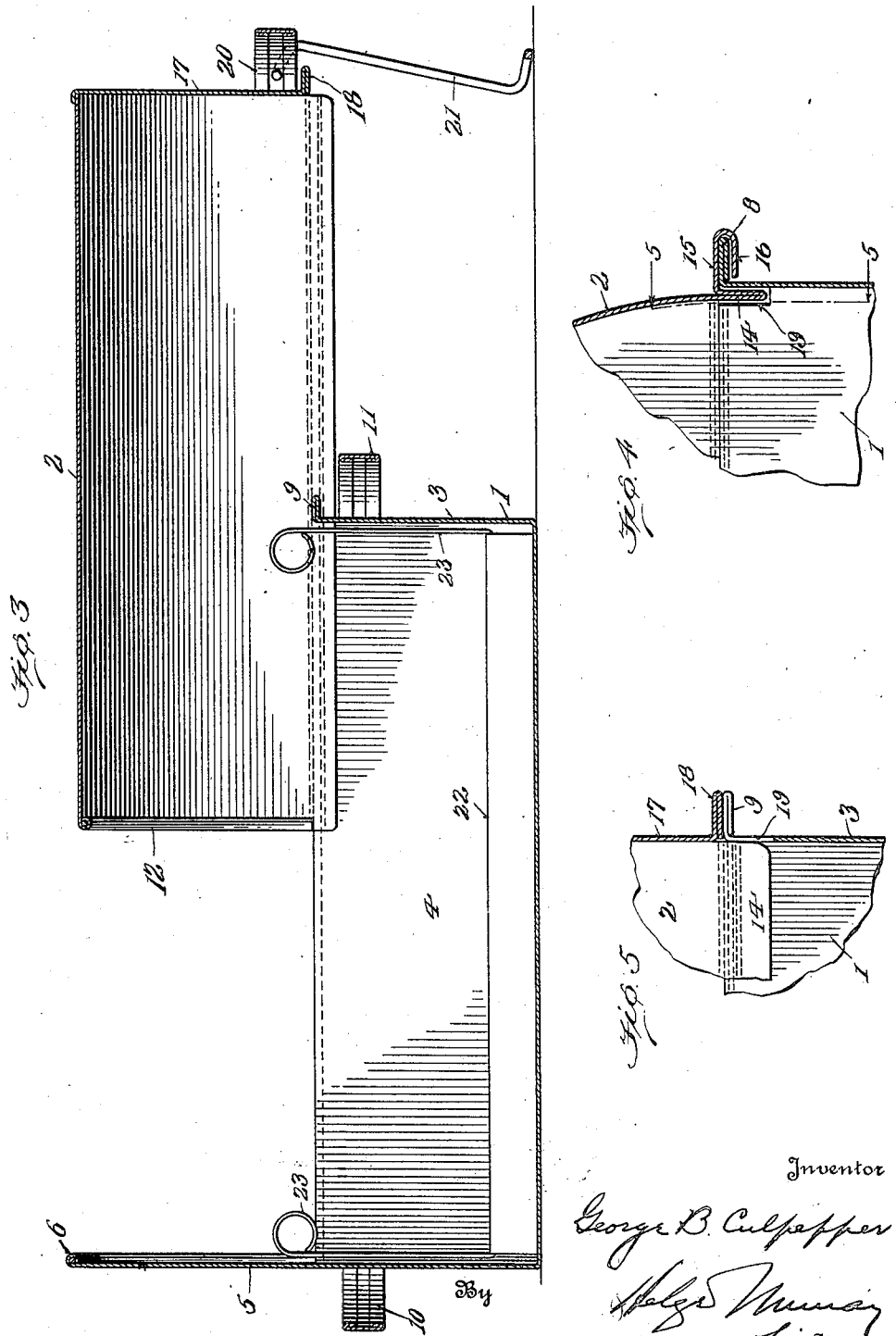

Patented Sept. 11, 1923.

1,467,710

UNITED STATES PATENT OFFICE.

GEORGE B. CULPEPPER, OF FORT VALLEY, GEORGIA.

COOKING VESSEL.

Application filed March 19, 1923. Serial No. 626,166.

*To all whom it may concern:*

Be it known that I, GEORGE B. CULPEPPER, a citizen of the United States, residing at Fort Valley, in the county of Houston and State of Georgia, have invented certain new and useful Improvements in Cooking Vessels, of which the following is a specification.

My invention relates to cooking vessels, and has been primarily designed for use in roasting, baking and stewing meats, fowl, and the like.

Generally stated, the invention involves a culinary vessel consisting of complementary sections slidably cooperating to receive and enclose the article or material to be cooked, the uppermost of said complementary sections being easily movable upon the lowermost of said sections to permit inspection and treatment of the contents as occasions require.

Particularly stated, my present invention includes the production of a cooking vessel formed with a lower section and an upper section, said sections being slidably associated and provided with an effective joint uniting the same whereby a minimum loss of heat is occasioned during the cooking operation, and the person operating the device is subjected to comparatively slight exposure to the escaping heat, steam, fluids and vapors when the respective sections are separated to view the contents.

A further feature of the invention is to provide a cooking vessel of simple and durable construction in which the complementary sections are united by a joint arranged upon the outside of the vessel and in spaced relation to the interior thereof so as to provide the greatest possible cooking space within said vessel.

A further object of the invention is to provide a culinary vessel of the class described in which the separable complementary sections when united are designed to form a substantially continuous interior, means being provided to extend across the joint at the juncture of said sections and within the interior of the vessel so as to prevent accumulation of juices, particles and other substances within the said joint.

A still further object of the invention is to provide a roasting, stewing or other type of cooking vessel, the upper section of which is designed to deflect and return the upwardly rising vapors and juices, the lower edges of said upper section having a portion adapted to extend within and below the points of juncture of the complementary sections forming the vessel.

A still further object of the invention is to provide a cooking vessel formed of separable sections with supporting means carried by one of said sections whereby when the sections are separated the overhanging section will be supported in its extended position.

A still further object of the invention is to provide a culinary vessel formed of separable complementary sections, the lowermost of said sections being adapted to receive an article supporting member, the said supporting member having upwardly extending handle means projecting above the lower section whereby the same can be easily removed in lifting an article from the vessel.

With these and other objects in view, the invention further consists in the construction, arrangement and combination of the several parts hereinafter described.

In the drawings illustrating an embodiment of my invention, the scope whereof is pointed out in the claims:

Figure 1 is a perspective view of my improved cooking vessel with the complementary sections shown in closed position.

Figure 2 is a vertical transverse sectional view illustrating the article supporting member in position.

Figure 3 is a vertical longitudinal sectional view showing the respective sections of the vessel in partially separated position, the outer end of the uppermost section being shown supported by the means carried at one end of said upper section.

Figure 4 is an enlarged detail sectional view through the joint formed at the junction of the upper and lower sections.

Figure 5 is a detail view taken on the line 5—5 of Figure 4, of another portion of the joint provided between said complementary sections.

Figure 6 is a detail vertical sectional view through the upper rear end of the vessel showing the manner in which the uppermost section fits beneath the projecting member of the lowermost section.

Figure 7 is a detail view showing in front elevation the manner in which the upper section is slidably positioned upon the projecting flange of the lower section with the depending portion of the upper section extending into said lower section.

Referring to the drawings in which similar reference characters designate corresponding parts in the several views, my improved cooking vessel includes among other things a lower article supporting section 1 and an upper cover section 2 slidably connected to provide convenient access to the interior of the vessel.

The lower section 1 is provided with a front wall 3, opposite side walls 4—4, and a relatively high rear wall 5, the latter determining the relative height of the cooking vessel and also the desired shape of the upper cover section. An inwardly extending bead or flange portion 6 is provided on the rear wall, said flange being formed by bending the outer edges of the metal around a suitable rod or wire 7, as best shown in Figure 6. The opposite side walls 4 of the lower section are provided at their upper ends with outwardly extending flanges 8, said flanges being formed and reinforced by bending the metal back upon itself, as clearly shown in Figure 7. The front wall 3 is also provided with an outwardly extending flange 9 which may be similarly formed and reinforced. A handle 10 is preferably provided upon the rear wall of the lower section, and a handle 11 is also carried by the lower section upon the front wall 3.

The upper cover section 2 is preferably curved to form a dome-like member as shown, said section being provided at its rear edge with a reinforcing flange or bead portion 12 adapted to co-act with the flange or bead 7 provided on the rear wall of the lower section. The metal at the rear edge of the cover section is bent around the rod or wire 13 to form the flange or reinforcing bead. A tight joint is formed between the sections at the junction of the rear wall 5 and rear edge of the cover section by the coaction of the respective flanges or beads 6 and 12.

The lower edges of the cover section are continued beneath the outwardly extending flanges 8 of the lower section to form portions 14 designed to overlie the joint formed at the junctions of the respective lower and upper sections. The upper section is also provided with outwardly extending flanged portions 15 along each side thereof, said portions being turned inwardly, as indicated at 16, to form suitable guide-ways into which the outwardly extending flanges 8 of the lower section are slidably fitted. In the construction shown the lower edges of the cover section are bent to form the depending portions 14 and the outwardly projecting and inturned portions 15 and 16, as clearly shown in Figure 4. This construction provides a strong and effective connection between the upper and lower sections in which there is little possibility of excessive loss of heat, steam and vapors from within the interior of the cooking vessel or the clogging of the joint by particles becoming lodged therein. In addition, the depending portions 14 carried by the upper section provide continuations thereof well down into the lower section whereby the upwardly passing steam, vapor and juices are effectively arrested and deflected downwardly without possibility of seeping through the joint provided at the slidable connection.

The front wall 17 of the cover section is provided with an outwardly extending flange 18 suitably reinforced by bending the metal back, as shown, said flange being adapted to contact the outwardly extending flange 9 of the lower section when the respective sections are united. The front wall 3 of the lower section is provided with openings 19 sufficiently large to permit the free passage of the depending portions 14 of the cover section to slide therethrough, as will be understood. A handle 20 is provided on the front wall 17 of the cover section and is preferably provided with a depending loop or bail-like member 21 adapted to form a supporting member for the cover section when the latter is extended, as shown in Figure 3. The provision of the supporting member 21 serves to relieve any bending stress incident to the slidable coacting flange connection between the respective complementary sections of the vessel which would be, as will be readily seen, imparted to said flange connection and prevent the easy separation of the sections.

An article supporting member 22 is preferably provided, said member being in the nature of a rack provided with upwardly extending handle members 23 at each end thereof. The handle members project above the side and front walls of the lower section 1 whereby the rack can be easily inserted and removed with comparatively slight exposure to the heat. The projection of the handles above the said portions of the lower section is possible because of the open rear end of the cover section. The bottom of the supporting member may be provided with a plurality of openings 24 through which the juices may drain.

A cooking vessel constructed in accordance with my present invention is particularly efficient in producing well cooked articles, losses incident to the cooking operation being reduced to a minimum and ample facilities being provided to permit rapid and easy inspection of the article with little likelihood of the person making said inspection being burned or otherwise affected by the escaping steam, vapors or juices. It will also be apparent that manufacturing advantages in the construction of my particular device are obtained.

Various changes may be made in the construction and arrangements of the several parts such as properly fall within the scope of the invention, and I do not wish to be understood as limiting my invention to the exact construction disclosed herein.

I claim:

1. A cooking vessel of the class described involving complementary separable sections, one of said sections forming the supporting portion for the article to be treated and the other of said sections providing a cover therefor, co-acting means provided upon the outside of said sections for slidably uniting the same, and means provided on one of said sections adapted to extend into the other of said sections, said last named means being arranged to cover the joint formed at the junction of said sections to provide a substantially continuous and uninterrupted cooking interior.

2. A cooking vessel of the class described including complementary supplemental sections, one of said sections forming the article supporting portion and being provided with a relatively high rear wall and the other of said sections providing a cover formed with a front wall and rear open end, co-acting means provided on the outside of said sections for slidably uniting the same throughout their length, means including depending flanges formed on said cover section and adapted to extend into the other of said sections, said flanges extending from the rear open end to the front wall of the cover and adapted to contact the rear wall of said article supporting portion, and means including a joint uniting the edge of the cover section at its open end with the relatively high rear wall of the first named section, said joint extending from the depending flange on one side of the cover to the depending flange on the other side of said cover and overlying the same longitudinally of the vessel for providing a tight joint through which steam, vapors and the like from the vessel cannot escape.

3. In a culinary vessel, the combination with a lower article receiving section and an upper cover section, means including co-acting projecting and partially surrounding flanges carried by said respective sections for slidably connecting the same, said flanges being disposed substantially horizontally upon the outside of said vessel, and means including a vertically disposed flange arranged upon the inside of the vessel and disposed to overlie the joint formed between said coacting flanges.

4. In a culinary vessel, the combination with a lower article supporting section of substantially rectangular shape and an upper cover section shaped to provide a curved cover above said lower section, means slidably connecting said sections, and means including a depending flange forming a continuation of the curved cover portion of said upper section, said flange being arranged to overlie the joint formed at the junction of said slidable connecting means.

5. A cooking vessel of the class described, comprising a lower article supporting section provided with an outwardly extending flange along its two sides and front wall portions, and an inwardly extending flange at its rear wall portion; and an upper cover section formed at its lower edge with a portion extending below said outwardly extending flanges of the lower section and overlying the joint formed between the article supporting section and the cover section, the said cover section being also provided with outwardly extending and inwardly turned flange portions adapted to slidably engage the outwardly extending flanges along the two sides of said lower section, said cover section at its rear edge being formed with a portion adapted to coact with the inwardly extending flange provided on the rear wall of said lower section, and having at its front edge an outwardly extending flange contacting the outwardly extending flange on the front wall portion of said lower section.

6. A cooking vessel of the class described involving a lower article supporting section and an upper cover section, means slidably connecting said sections upon the outside of the vessel, and means adapted to overlie the joint formed between said slidable connecting means, said last named means being carried by at least one of said sections and adapted to slide through openings provided in the other of said sections.

7. A cooking vessel of the class described comprising a lower section provided with a handle on its front wall, an upper cover section provided with a handle on its front wall, means including longitudinally disposed coacting flanges slidably connecting said sections together, and means extending from the handle of said upper section for supporting the same in extended position without strain upon the coacting flanges forming the slidable connection.

8. A culinary vessel of the class described comprising a lower supporting section having a relatively high rear wall, an article supporting rack spaced from the bottom of said section and having handles projecting above the side and front walls thereof, an upper cover section having an open rear end adapted to co-act with said relatively high rear wall of said lower section and provided with a depending flange adapted to overlie the joint formed between the article supporting section and said cover, means slidably connecting said sections together with the respective front walls of said lower and cover sections substantially equal the height of said relatively high rear wall of the lower section, whereby said cover section can be extended with relation to said lower section without contacting the upwardly projecting handles of said article supporting member.

9. A cooking vessel of the class described including complementary separable sections, one of said sections forming the article supporting portion and being provided with a relatively high rear wall and the other of said sections providing a cover formed with a front wall and rear open end, means including a joint uniting the edge of the second named section at its open end with the relatively high rear wall of the first named section, means provided on said sections for slidably uniting the same, and means arranged upon the interior of the vessel and adapted to overlie the joint formed at the junction of the said separable sections.

10. A cooking vessel of the class described involving an article receiving section and a cover section thereof, means including a joint formed at the junction of said separable sections for slidably uniting the same, and means provided on said vessel and adapted to overlie the said joint for providing a substantially continuous and uninterrupted cooking interior.

In testimony whereof I affix my signature.

GEORGE B. CULPEPPER.